United States Patent
Zhang (10) Patent No.: US 8,914,038 B2
(45) Date of Patent: *Dec. 16, 2014

(54) METHOD AND ARRANGEMENT FOR DETERMINING TERMINAL POSITION

(75) Inventor: Yang Zhang, Shanghai (CN)

(73) Assignee: Telefonaktiebolaget L M Ericsson (Publ), Stockholm (SE)

(*) Notice: Subject to any disclaimer, the term of this patent is extended or adjusted under 35 U.S.C. 154(b) by 524 days.

This patent is subject to a terminal disclaimer.

(21) Appl. No.: 13/305,154

(22) Filed: Nov. 28, 2011

(65) Prior Publication Data

US 2012/0108263 A1 May 3, 2012

Related U.S. Application Data

(63) Continuation-in-part of application No. 13/148,182, filed as application No. PCT/SE2009/050150 on Feb. 11, 2009, now Pat. No. 8,135,416.

(51) Int. Cl.
*H04W 24/00* (2009.01)
*G01S 5/02* (2010.01)
*H04W 64/00* (2009.01)

(52) U.S. Cl.
CPC .............. *G01S 5/0221* (2013.01); *H04W 64/00* (2013.01)
USPC .................................. 455/456.1; 455/404.1

(58) Field of Classification Search
CPC .......................... H04W 64/00; G01S 5/0221
USPC ............ 455/456.1–456.6, 404.2, 403, 404.1, 455/422.1

See application file for complete search history.

(56) References Cited

U.S. PATENT DOCUMENTS

| | | | |
|---|---|---|---|
| 5,732,354 A * | 3/1998 | MacDonald | 455/456.2 |
| 6,356,608 B1 * | 3/2002 | Atarius | 375/362 |
| 2003/0139188 A1 | 7/2003 | Chen et al. | |
| 2004/0072582 A1 * | 4/2004 | Aljadeff et al. | 455/456.1 |

(Continued)

FOREIGN PATENT DOCUMENTS

| | | |
|---|---|---|
| CN | 1476262 A | 2/2004 |
| EP | 1545145 A1 | 6/2005 |

OTHER PUBLICATIONS

3rd Generation Partnership Project, "3rd Generation Partnership Project; Technical Specification Group GSM/EDGE Radio Access Network; Location Services (LCS); Mobile Station (MS)—Serving Mobile Location Centre (SMLC) Radio Resource LCS Protocol (RRLP) (Release 8)", Technical Specification, 3GPP TS 44.031 V8.0.0, Sep. 1, 2008, pp. 1-140, 3GPP, France.

(Continued)

*Primary Examiner* — Ajit Patel
(74) *Attorney, Agent, or Firm* — Coats & Bennett, PLLC (57) ABSTRACT

A method and apparatus for determining the position of mobile terminals in a cell of a mobile communication network where timing-based alignment is employed for terminal transmissions in timeslots to a serving base station. First, the distance to the base station is determined for at least one mobile terminal in the cell. A current timing value used by the at least one mobile terminal for timing adjustment of signal transmissions is also obtained. A relation between the determined timing independent distance and the obtained current timing value for each terminal is then estimated, and a timing bias of the cell or the at least one mobile terminal is determined based on the estimated relation. The position of subsequent terminals can then be determined using a timing based positioning method and the timing bias, such that the current timing value used by the subsequent terminal is adjusted by the timing bias.

24 Claims, 8 Drawing Sheets

(56) References Cited

U.S. PATENT DOCUMENTS

| | | |
|---|---|---|
| 2005/0053099 A1 | 3/2005 | Spear et al. |
| 2008/0014960 A1 | 1/2008 | Chou |
| 2010/0227628 A1 | 9/2010 | Anderson et al. |
| 2010/0234043 A1 | 9/2010 | Wigren et al. |

OTHER PUBLICATIONS

3rd Generation Partnership Project, "3rd Generation Partnership Project; Technical Specification Group GSM/EDGE Radio Access Network; Location Services (LCS); Serving Mobile Location Centre—Base Station System (SMLC-BSS) interface; Layer 3 specification (Release 8)", Technical Specification, 3GPP TS 48.071 V.8.0.0, Dec. 1, 2007, pp. 1-22, 3GPP, France.

3rd Generation Partnership Project, "3rd Generation Partnership Project; Technical Specification Group GSM/EDGE Radio Access Network; Location Services (LCS); Base Station System Application Part LCS Extension (BSSAP-LE) (Release 8)", 3GPP TS 49.031 V8.0.0, Sep. 1, 2008, pp. 1-51, 3GPP, France.

* cited by examiner

METHOD AND ARRANGEMENT FOR DETERMINING TERMINAL POSITION

The present application is a continuation-in-part of pending U.S. application Ser. No. 13/148,182, filed 5 Aug. 2011, which is a 371 of International Application No. PCT/SE2009/050150 filed 11 Feb. 2009.

TECHNICAL FIELD

The present invention relates generally to a method and arrangement for determining the position of mobile terminals in a mobile network where timing adjustment is employed for terminal transmissions in timeslots.

BACKGROUND

Mobile networks are generally capable of providing information on the whereabouts of their subscribers, e.g., to an emergency facility, a traffic surveillance centre or other service unit needing or even requiring such positioning information. In general, mobile networks may sometimes be required to provide and certify the location or position of a subscriber in order to support emergency services and other location dependent services. Various positioning functions are therefore typically employed in the mobile networks for locating terminals connected to base stations in cells of the network.

These positioning functions may include simply identifying the cell currently serving a terminal of interest, which can provide an accurate enough position when the terminal is connected to a base station serving a relatively small cell, but not particularly accurate when connected to a base station serving a larger cell. A more accurate position may further be derived from a used timing advance when the serving cell is known and/or signal strength measurements on signals from different base station sites, the latter method being known as "triangulation".

Figure 1A:
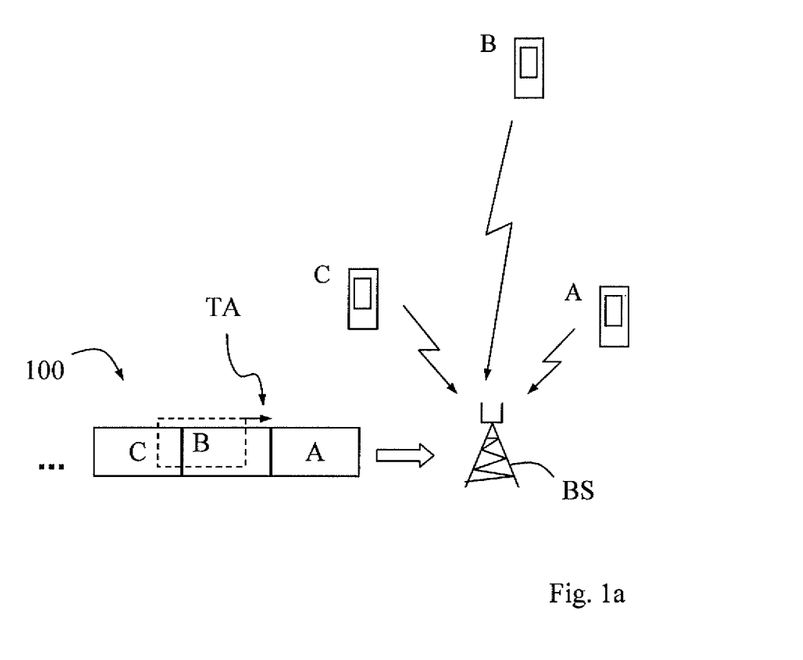
FIGS. 1a and 1b show schematic illustrations of how timing adjustment is used according to general practice.

The concept of time alignment or timing advance is generally used in mobile networks employing time division multiplexing where terminals sharing the same transmit frequency are directed to transmit their signals during allocated timeslots, commonly referred to as TDMA (Time Division Multiplex Access). FIG. 1a illustrates schematically how timing advance is used in a cell covered by a base station BS. Three mobile terminals A, B and C are currently connected to the serving base station BS, and different timeslots 100 are allocated to the terminals such that terminals A, B, C are directed to transmit signals "A", "B" and "C" in successive timeslots 100, respectively, as indicated in FIG. 1a. The terminals A-C are thus synchronised with BS to allow for proper timing of the transmission and reception of signals.

In this example, terminals A and C are located relatively close to BS, while terminal B is located at a greater distance from BS. As a result, the signals from terminals A and C will arrive basically "in time" to BS while the signals from terminal B would arrive somewhat late due to propagation delays, thus not exactly fitting into the allocated timeslot when received at BS, which could cause interference due to overlap with signals from terminal C in this case. In order to avoid such interference, BS orders terminal B to transmit its signals somewhat earlier by a parameter called Timing Advance TA. This mechanism is generally referred to as time alignment. Thus, by adjusting the timing of transmissions from terminal B in this way, the signals will arrive properly at BS in the allocated timeslot as indicated in FIG. 1a.

Although the parameter TA was originally conceived to adjust terminal transmissions to fit into a timeslot scheme at the receiving base station, TA has been frequently utilised to provide location information as well. As the propagation speed of radio signals is known to equal the speed of light C, the TA used by a specific terminal further implies the distance D between that terminal and the serving base station as $D = \frac{1}{2} C \times TA$. According to 3GPP ($3^{rd}$ Generation Partnership Project), TA is specified as an integer between 0 and 63 representing time steps in the interval 0 µs through 232 µs, each step thus representing approximately 3.7 µs which corresponds to 553 m of signal propagation. The location of a terminal can thus be estimated by knowing the location of the serving base station and the TA used. In many mobile systems, the base station's location is basically given by a parameter "CGI" (Cell Global Identity) providing the coordinates of the base station.

Figure 1B:
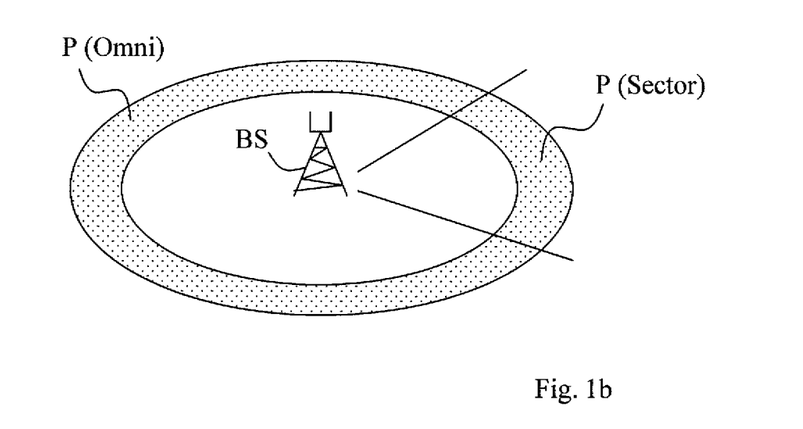

FIG. 1b illustrates that when a mobile terminal, not shown, is directed by a serving base station BS to use a specific timing advance value TA to adjust its transmissions, that TA value can further be used to calculate an expected terminal distance from BS as being within a potential position area P at a distance of TA×553 m from BS, according to 3GPP. If BS covers 360°, i.e., an omni cell, the terminal is presumably located somewhere within a circle area or ring P(Omni), while if BS covers a sector less than 360°, i.e., a sector cell, the terminal can be somewhere within a circle sector area P(Sector), as illustrated in FIG. 1b. For example, if TA=10, the terminal is expected to be located at a distance of around 5.5 km from the base station. Since TA is specified in 3GPP according to predefined integers, the expected terminal/base station distance can be determined within an uncertainty interval of 553 m.

The above positioning method is frequently used in GSM systems and other similar mobile systems using timing adjustment. Utilising the CGI/TA information for positioning is particularly attractive since it is promptly available at the serving base station or at a base station controller BSC, and no further measurements nor added functionality in terminals are necessary.

However, the CGI/TA based positioning method is sometimes not very accurate as the TA parameter is primarily determined to make terminal transmissions arrive in time for allocated timeslots at the base station, but not as a measure of distance. At present, mobile systems are not obliged to set the TA parameter for correct position determination. As a result, differently configured base stations, e.g., made by different vendors or operators, may consistently set different TA values for terminals located at the same distance, yet providing equivalent communication quality. This trait has actually been confirmed by field testing.

Using TA for terminal transmissions not only compensates for propagation of radio waves in the air but also for any delays due to propagation, switching and processing of signals within the base station, which may differ depending on the configuration of hardware and software in the base station. It is thus a problem that the CGI/TA based positioning method is not wholly reliable and may produce different results depending on base station configuration. It would be desirable to produce basically the same positioning results regardless of the equipment used.

SUMMARY

It is an object of the invention to address at least some of the problems outlined above, and to provide a solution for increasing accuracy and reliability when determining the position of mobile terminals. These objects and others may be obtained by providing a method and apparatus according to the attached independent claims.

According to one aspect, a method is provided for determining the position of mobile terminals in a cell of a mobile communication network where time alignment is employed for terminal transmissions in timeslots to a serving base station providing radio coverage in the cell. The distance (D) to the base station is determined for at least one mobile terminal in the cell. A current timing value (T), e.g., a Time Alignment (TA) value, a timing value determined based on a Round-Trip Time (RTT) value, etc., is also obtained that is used by the at least one mobile terminal for timing adjustment of signal transmissions. Then, a relation between the determined timing independent distance and the obtained current timing value for each mobile terminal is estimated. A timing bias of the cell or the at least one mobile terminal is further determined based on the estimated relation, and the position of a subsequent terminal is determined using a timing based positioning method and the timing bias such that the current timing value used by the subsequent terminal is adjusted by the timing bias. Thereby, the timing based positioning method will become more closely related to the true terminal position.

According to another aspect, an arrangement is provided in a positioning unit for determining the position of mobile terminals basically according to the method above. In this arrangement, the positioning unit comprises a distance determining unit adapted to determine the distance (D) to the base station for at least one mobile terminal in the cell. The positioning unit further comprises an obtaining unit adapted to obtain a current timing value (T), e.g., a Time Alignment (TA) value, a timing value determined based on a Round-Trip Time (RTT) value, etc., used by the at least one mobile terminal for transmission. The positioning unit also comprises a logic unit adapted to estimate a relation between the determined timing independent distance and the obtained current timing value for each mobile terminal, and to determine a timing bias of the cell or the at least one mobile terminal based on the estimated relation. The positioning unit also comprises a position determining unit adapted to determine subsequent terminal positions using a timing based positioning method and the timing bias.

The method and arrangement above can be implemented according to different embodiments. In one embodiment, the logic unit estimates the relation by translating each determined timing independent distance into a timing value that is compared with the obtained current timing value used for signal transmissions. In that case, the logic unit can determine the timing bias based on the deviation of the timing value used for signal transmissions from the translated timing value.

In another embodiment, the logic unit estimates the relation by translating each obtained timing value into a timing based distance that is compared with the corresponding determined TA independent distance. In that case, the logic unit can determine the timing bias based on the deviation of the translated timing based distance from the determined timing independent distance.

In further embodiments, the obtaining unit obtains the current timing value from a base station controller in signalling messages of a positioning method according to any of: CGI/TA, U-TDOA and a satellite based navigation or positioning system.

In yet another embodiment, a sequence of T and D (terminal/base station distance) pairs $\{T(i),D(i)\}$, $i=1 \ldots N$ are obtained for a plurality of mobile terminals in the cell, and the timing bias of the cell or at least one of the mobile terminals is determined by performing a search for a Minimum Mean Absolute Error (MMAE), using the $\{T,D\}$ pairs as input in a formula of Mean Absolute Error "MAE" defined as:

$$MAE = \frac{1}{N}\sum_{i=1}^{N} \text{abs}\left(T(i) - \text{round}\left(\frac{2}{C*Tc}D(i) + \text{bias}\right)\right)$$

where round represents an operator of rounding to the nearest integer, abs represents an operator providing an absolute value, bias represents a timing bias variable for MMAE searching, C represents the speed of light, and Tc represents a time interval corresponding to one alignment step.

In the embodiment above, a range of timing values may be selected within which the MMAE search is executed, and an MAE value may be calculated using different candidate timing bias values and the $\{T,D\}$ pairs as input to the MAE formula. A search for MMAE among the calculated and stored values of MAE can then be performed and the timing bias value that provides the MMAE can be used as the timing bias for position determination using the timing based positioning method.

Further features and benefits of the invention will become apparent from the detailed description below.

BRIEF DESCRIPTION OF THE DRAWINGS

Exemplary embodiments of the invention will now be described in more detail and with reference to the accompanying drawings, in which.

DETAILED DESCRIPTION

A mechanism and procedure are provided which can basically be used to obtain better accuracy when determining the position of mobile terminals in a mobile network that employs timing adjustment. Briefly described, this solution can make the timing parameter more closely related to the true distance between a mobile terminal and its serving base station, thereby providing more accurate and reliable position determination based on the timing value currently used for a terminal of interest.

In order to calibrate the timing parameter for a specific cell, the distance (D) between a mobile terminal in the cell and the base station is determined using, e.g., a timing independent positioning method that is preferably more reliable and accurate than any timing based positioning method. The timing value (T) currently valid for the terminal's signal transmissions is also obtained and stored together with the associated distance determined by the timing independent method. The relation between the obtained current timing value and determined distance is also estimated from stored timing/distance pairs obtained and determined for a plurality of terminals. A general timing bias is then determined for the cell or at least one mobile terminal based on the estimated timing/distance relation.

Effectively, the timing bias represents a deviation between a current timing value and the actual distance to the base station for a terminal using that timing value for transmissions. The determined timing bias can then be used as a calibration parameter for position determination using a timing based positioning method. For example, the timing bias can be used to adjust the currently valid timing value for any subsequent terminal in the cell, and that terminal's position is then determined based on the adjusted timing value using the timing based positioning method. Thereby, the timing values used in a particular cell for timing adjustment of terminal transmissions in timeslots, are adjusted to be more accurate for positioning by being more closely related to the true geographical distance between connected terminals and the base station.

The position determining method and apparatus are first described herein in terms of Time Alignment (TA) as used in Global System For Mobile communications (GSM) networks. It will be appreciated that the position determining method and apparatus may also be used for other timing-based position operations associated with other communication standards, e.g., Round-Trip Time (RTT) as used in Wideband Code Division Multiple Access (WCDMA).

Figure 2:
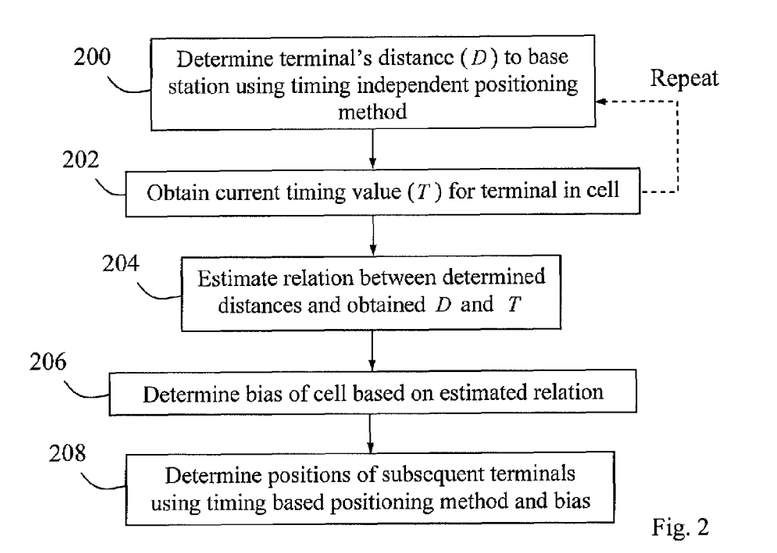
FIG. 2 shows a flow chart illustrating a procedure for increasing the accuracy for determining the position of a mobile terminal, according to one exemplary embodiment.

An exemplary procedure for determining the position of mobile terminals in a cell will now be described with reference to a flow chart shown in FIG. 2. The cell belongs to a mobile communication network where timing adjustment is generally employed for terminal transmissions in timeslots to a serving base station providing radio coverage in the cell. The shown procedure may be executed by a positioning unit or the like serving the mobile network.

In a first step 200, the distance between the base station and a terminal connected thereto is determined using a TA independent positioning method, which preferably has a higher accuracy and reliability than a TA based positioning method. This distance is thus calculated between the terminal's position determined by the TA independent method and the base station's position which can be derived from a known CGI parameter or is otherwise known in the network.

A TA value which is valid for the terminal for timing adjustment of signal transmissions during an allocated timeslot, is obtained from the network in a next step 202 and stored together with the distance determined in step 200, to form a TA/distance pair. It is thus assumed that the mobile terminal has been directed by the serving base station to use a suitable selected TA value in a conventional manner to adjust the timing of its transmissions to fit into the allocated timeslot, i.e., basically as described above for FIG. 1a. The currently used TA value can normally be obtained from the serving base station, or from a BSC or other similar node controlling the base station depending on the network configuration.

Steps 200-202 are then repeated for a plurality of mobile terminals connected to the base station and using various TA values for uplink timing adjustment, depending on signal propagation delays. Thereby, a plurality of TA/distance pairs are collected to form a basis for determining a general TA bias for the cell or at least one mobile terminal, where the timing bias represents a deviation of the network obtained TA parameter from the true distance between terminal and base station.

It is thus assumed that the position determined by the TA independent positioning method is closely related to the terminal's true position, whereas the obtained TA value corresponds to a position deviating from the true position. Thus, the distance determined in step 200 is a more or less "true" distance to the base station. It should be noted that the TA value obtained in step 202 should be valid for the terminal basically at the same time as the TA independent positioning method is used according to step 200. In some systems, the TA value can be extracted from signaling messages communicated for the positioning procedure, which will be described in more detail further on in this disclosure.

In a further step 204, a relation is generally estimated between the network obtained TA values and associated distances to the base station as determined by using the TA independent positioning method according to step 200. According to a first alternative, this relation may be estimated by translating each determined "true" distance into a TA value that is compared with the corresponding TA value used for time alignment. According to a second alternative, the relation in step 204 may be estimated by translating each obtained TA value into a TA based distance that is compared with the corresponding "true" distance determined for the terminal according to the TA independent positioning method.

A general TA bias is then determined for the cell or at least one mobile terminal in a next step 206, based on the estimated relation between determined distances and associated TA values. In the first alternative above, the TA bias may be determined based on the deviation of the TA value used for transmission from the translated TA value. In the second alternative above, on the other hand, the TA bias may be determined based on the deviation of the translated distance from the determined "true" distance.

The determined TA bias can finally be used when determining any subsequent terminal position by the conventional TA based positioning method, as shown in a final step 208. For example, the TA value currently used for a terminal of interest for time alignment can be adjusted by the TA bias to be more closely related to the true distance between the terminal and its serving base station, to form an adjusted TA value which is used as input to the TA based positioning method. Alternatively, the TA bias can be translated into a distance deviation that is added or deducted from the position determined from the TA value used for transmission.

Thereby, a more accurate and reliable position determination can be provided when only using the TA based positioning method for terminals served by the base station in the cell. Thus, steps 200-206 can be seen as a calibration procedure for the cell, while step 208 utilizes the calibration for simple yet accurate and reliable position determination. While the TA bias is determined exclusively based on conditions in that cell, it may be suitable to use the same TA bias in other cells as well, e.g., if the conditions for signal propagation and processing are considered to be basically similar in those cells.

It should be noted that if a greater number of such TA/distance pairs are collected in steps 200 and 202, the more accurate overall TA bias will be obtained for the cell. In practice, the TA bias of a cell can be determined in different ways. For example, the relation between obtained TA values and corresponding determined distances can be estimated by simply calculating a deviation of each collected TA/distance pair and then averaging the multiple calculated deviations. The calculated mean deviation can be translated into a time value that constitutes the general TA bias. It is also possible to determine the TA bias by searching for a Minimum Mean Absolute Error (MMAE) of a sequence of TA samples and associated distances, which will be described in more detail below.

Figure 3:
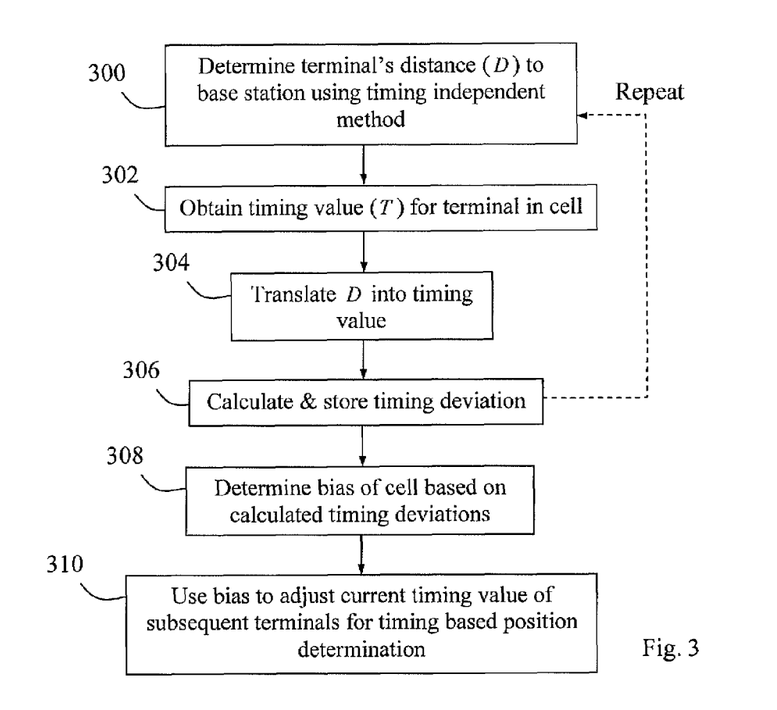
FIG. 3 shows a flow chart illustrating a procedure for increasing the accuracy for determining the position of a mobile terminal, according to another embodiment.

Another exemplary procedure in a positioning unit for determining the position of mobile terminals in a cell covered by a base station, will now be described with reference to a flow chart shown in FIG. 3. In a first step 300, the distance between a terminal and the base station is determined using a TA independent positioning method, as in step 200 above, presumably being closely related to the terminal's true position. A TA value used by the terminal for time alignment in the cell is also obtained in a next step 302, as in step 202 above.

In a further step 304, the distance to the base station determined in step 300, is translated into a corresponding TA value. Then, a deviation between the translated TA value and the TA value used for time alignment is calculated and stored in a step 306.

Steps 300-306 are then basically repeated for a plurality of mobile terminals connected to the base station and using various different TA values for uplink time alignment. It should be noted that step 302 can be executed after or at the same time as step 304, since translating the "true" distance into a TA value and obtaining a TA value used for time alignment, can be made independently in this example. However, the TA value obtained in step 302 should be valid for the terminal basically at the same time as the TA independent positioning method is used according to step 300, that is, the terminal should be in chiefly the same position at steps 300 and 302.

In this way, a basis is formed for determining a general TA bias of the cell or a mobile terminal, in a further step 308, based on stored deviations in the distance between the two positioning methods as calculated for different mobile terminals according to the foregoing steps. The TA bias can be estimated by simply averaging the multiple deviations calculated and stored according to step 306, and then translating the mean deviation into a time value that constitutes the general TA bias.

The determined TA bias can now be applied in a final step 310 to adjust a current TA value of any subsequent terminal and then use the adjusted TA value as input to the TA based positioning method, in order to provide a more accurate position for the terminal.

Figure 4:
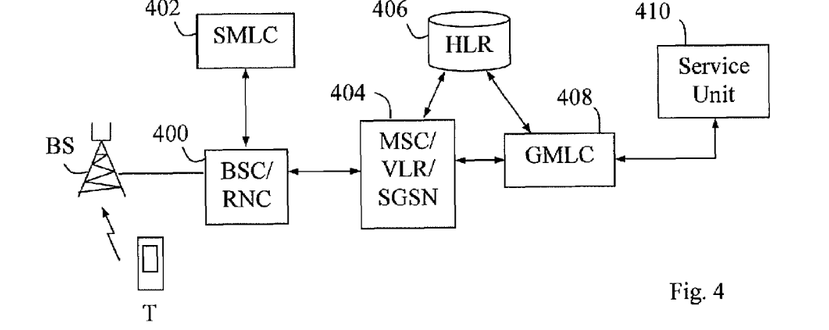
FIG. 4 shows a schematic view illustrating a network configuration that can be used for implementing the invention in GSM and WCDMA networks, according to another exemplary embodiment.

FIG. 4 illustrates a possible network scenario for GSM and WCDMA networks in which the present solution can be implemented. A BSC 400 controls a base station BS to which a terminal T is connected using a TA value for time alignment of uplink signal transmissions. A positioning unit denoted SMLC (Serving Mobile Location Centre) 402 is connected to the BSC 400 and is adapted to execute the positioning process of the present solution, e.g., according to either of FIG. 2 and FIG. 3.

BSC 400 and its base stations belong to a mobile network that further includes an MSC/VLR (Mobile Switching Centre/Visited Location Register) node 404, an HLR (Home Location Register) 406 and a GMLC (Gateway Mobile Location Center) 408. An external service unit 410 is able to request for the position of various mobile terminals served by the network, such as the shown terminal T. Service unit 410 may be an emergency centre or any application generally providing services requiring the position of terminals, which is however outside the scope of the present description.

The GMLC 408 is the first access node for the service unit 410 and is able to request for routing information from the HLR 406 over an Lh interface. GMLC 408 may also send positioning requests to the MSC/VLR node 404 and receive location estimates based on the TA based method, over an Lg interface. The SMLC 402 manages the overall co-ordination and scheduling of resources needed for locating a terminal. It may also be configured to calculate the final location and velocity estimate and may further also estimate the achieved accuracy. Since SMLC 402 needs to frequently obtain location related information (e.g., CGI and TA) of terminals, it is preferably directly connected to BSC 400.

During a positioning procedure, GMLC 408 may authenticate a positioning request from service unit 410 and forward it to BSC 400 via MSC/VLR 404 across the A, Gb or Iu interface. BSC 400 then passes the request to the SMLC 402 for processing according to the described embodiments.

Figure 5:
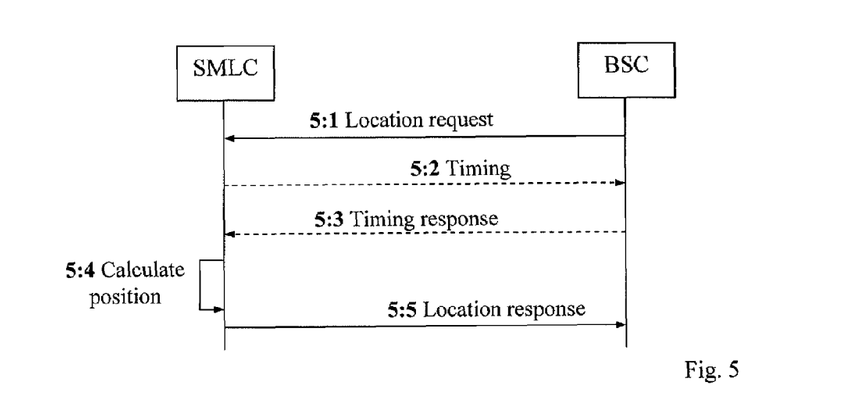
FIGS. 5-7 show signalling diagrams that can be used to provide the position of a mobile terminal in GSM and WCDMA networks, according to some further embodiments.
Figure 6:
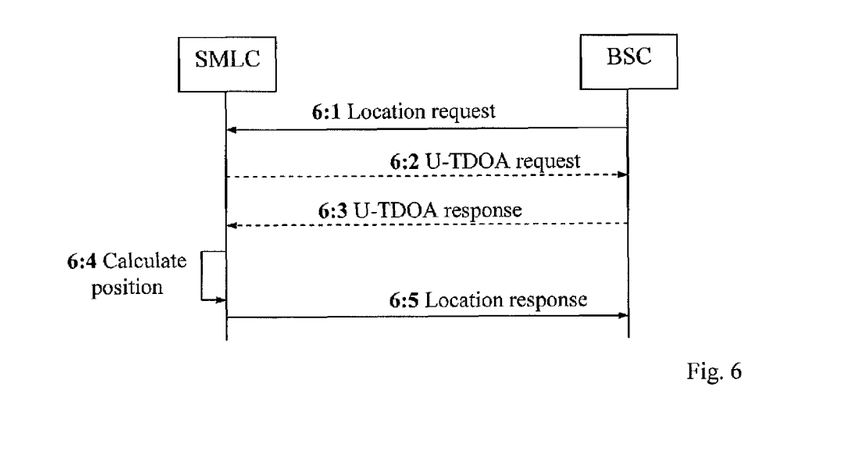
Figure 7:
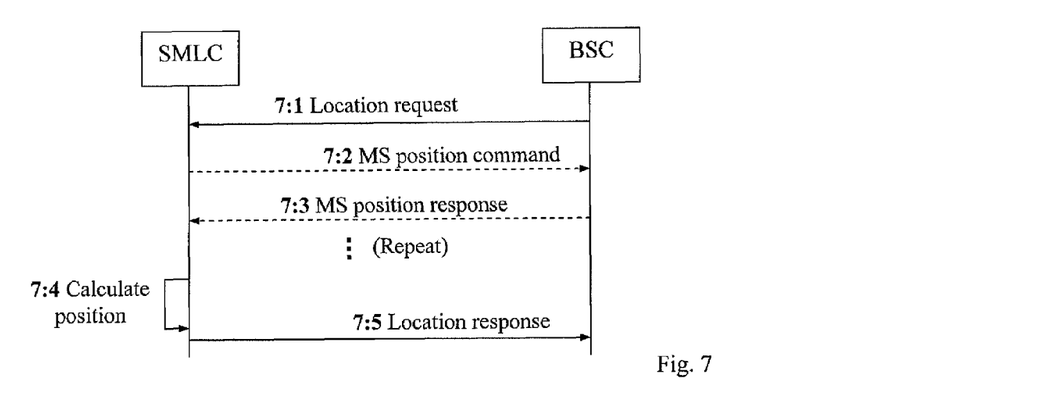

FIGS. 5-7 are signalling diagrams illustrating how the SMLC 402 can obtain a TA value currently used for time alignment from the BSC, e.g., as indicated in steps 202 and 302 above. FIG. 5 relates to a practical case when the CGI/TA based positioning method is used. The BSC forwards a "perform location request" 5:1 to the SMLC, originally coming from a service unit, not shown, to obtain the position of a terminal. The TA value is an optional element in the location request procedure. Otherwise, a separate TA request 5:2 may be sent from the SMLC to the BSC, and a TA response 5:3 is then conveyed in return to the SMLC. After calculating the terminal's position in a schematic step 5:4 according to the procedure described above, the SMLC provides a "perform location response" 5:5 to the BSC.

FIG. 6 relates to another practical case when a so-called U-TDOA (Uplink Time Difference Of Arrival) based positioning method is used. The BSC forwards a "perform location request" 6:1 to the SMLC, to obtain the position of a terminal. According to the U-TDOA method, a U-TDOA request 6:2 is sent from the SMLC to the BSC, basically requesting for various physical channel information (frequencies, hopping sequence, channel type, timeslot, sub-channel number, etc), the used MS (Mobile Station) power, a cell identifier and the current TA value. This information is generally useful for U-TDOA measurements, not necessary to describe here further. A TA response 6:3 with the requested information is then conveyed in return to the SMLC. After calculating the terminal's position in a schematic step 6:4 according to the procedure described above, the SMLC provides a "perform location response" 6:5 to the BSC.

FIG. 7 relates to another practical case when a satellite based positioning method is used, sometimes referred to as "AGPS/AGNSS" (Assisted GPS/Assisted GNSS) where the term GNSS (Global Navigation Satellite System) generally represents any satellite based navigation or positioning systems, such as GPS, Gallileo, etc. In the case of GPS, AGPS or so-called "autonomous" GPS may be used.

The BSC forwards a "perform location request" 7:1 to the SMLC, to obtain the position of a terminal. In this case, the SMLC needs to deliver instruction assistance data to the terminal which needs to request for further assistance data or send back a positioning result to the SMLC. This information can be delivered through the protocol RRLP (Radio Resource LCS (Location Services) Protocol), and an RRLP message can be encapsulated in the messages "MS Position Command" 7:2 and "MS Position Response" 7:3.

For each satellite based positioning attempt, a few "MS Position Command/Response" message pairs 7:2, 7:3 will typically be exchanged between SMLC and BSC, as indicated in FIG. 7. The "MS Position Response" 7:3 will not only include the RRLP message but also an optional TA value element, which can thus be used to accomplish steps 202 and 302 above. After calculating the terminal's position in a schematic step 7:4 according to the procedure described above, the SMLC provides a location response 7:5 to the BSC.

Figure 8:
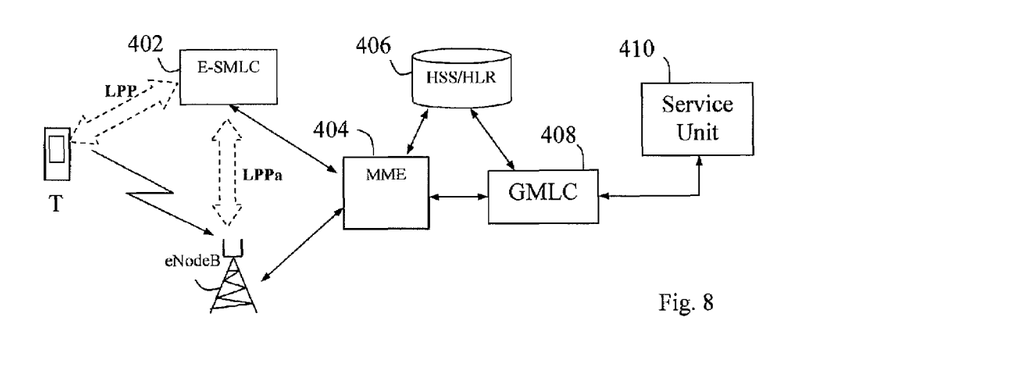
FIG. 8 shows a schematic view illustrating a network configuration that can be used for implementing the invention in LTE networks, according to another exemplary embodiment.

FIG. 8 illustrates a possible network scenario for LTE networks in which the present solution can be implemented. An eNodeB connects to a terminal T. A positioning unit denoted E-SMLC 402 connects to the eNodeB and is adapted to execute the positioning process disclosed herein, e.g., according to either of FIGS. 2 and 3. For LTE networks, both the LTE Positioning Protocol (LPP) and the LPPa can be used to determine the TA value. For example, the TA value can be obtained (directly or after processing) from an LPP element as a "UE Rx Tx Time Difference" or from an LPPa element as a "Timing Advance Type 1" or a Timing Advance Type 2."

The eNodeB belongs to a mobile network that further includes an MME (Mobility Management Entity) node 404, an HSS/HLR (Home Subscriber Server/Home Location Register) 406 and a GMLC (Gateway Mobile Location Center) 408. An external service unit 410 is able to request for the position of various mobile terminals served by the network, such as the shown terminal T. Service unit 410 may be an emergency centre or any application generally providing services requiring the position of terminals, which is however outside the scope of the present description.

The GMLC 408 is the first access node for the service unit 410 and is able to request for routing information from the HSS/HLR 406 over an SLh interface, which is an interface between the GMLC 408 and the HSS 406. GMLC 408 may also send positioning requests to the MME node 404 and receive location estimates based on the TA based method, over an SLg interface, which is an interface between the GMLC 408 and the MME 404. The E-SMLC 402 manages the overall co-ordination and scheduling of resources needed for locating a terminal T. It may also be configured to calculate the final location and velocity estimate and may further also estimate the achieved accuracy.

During a positioning procedure, GMLC 408 may authenticate a positioning request from service unit 410 and forward it to the MME node 404 across the SLg interface. MME 404 then passes the request to the E-SMLC 402 for processing according to the described embodiments.

Figure 9:
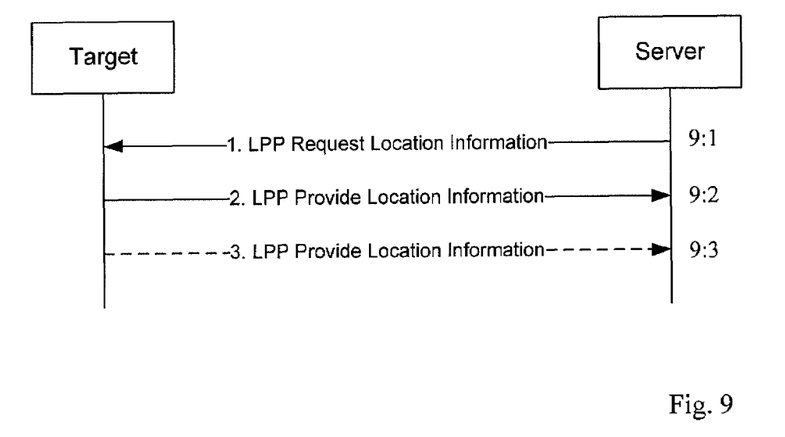
FIGS. 9-10 show signalling diagrams that can be used to provide the position of a mobile terminal in LTE networks, according to some further embodiments.
Figure 10:
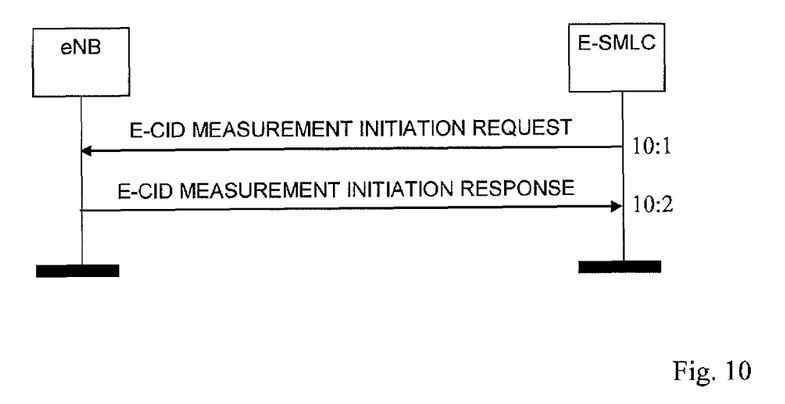

FIGS. 9-10 are signalling diagrams illustrating how the E-SMLC 402 can obtain a TA value currently used for time alignment, e.g., as indicated in steps 202 and 302 above. FIG. 9 relates to a practical LTE case for LPP. The Server (e.g., the E-SMLC) sends an LPP location request 9:1 to the Target (e.g., the UE or T). In response, the Target provides the location information 9:2, 9:3 to the Server using one or more messages. The additional information (e.g., that associated with 9:3 and other messages) may be, for example, reported periodically, and may be used to calculate a more precise TA or location estimate.

FIG. 10 relates to another practical LTE case for LPPa. The E-SMLC 402 sends an E-CID (Enhanced Cell ID) measurement initiation request to the eNodeB. In response, the eNodeB sends an E-CID measurement initiation response to the E-SMLC 402.

A practical example of how a more accurate TA based position adjusted by a TA bias can be obtained, will now be described in more detail with reference to the flow chart shown in FIG. 11. In this example, the TA bias is estimated by performing a search for a Minimum Mean Absolute Error "MMAE", using a sequence of available T and D (terminal/base station distance) pairs $\{T(i),D(i)\}$, i=1 ... N as input in Equation (1) below. The available $\{T,D\}$ pairs may have been obtained according to the above steps 200, 202 and 300, 302, respectively. The Mean Absolute Error "MAE" can thus be defined as:

$$MAE = \frac{1}{N}\sum_{i=1}^{N} \text{abs}\left(T(i) - \text{round}\left(\frac{2}{C*Tc}D(i) + \text{bias}\right)\right), \quad (1)$$

where D represents the timing independent distance, T represents the current timing value, round represents an operator of rounding to the nearest integer, abs represents an operator providing an absolute value, bias represents a timing bias variable for MMAE searching, C represents the speed of light, and Tc represents a time interval corresponding to one alignment step.

Figure 11:
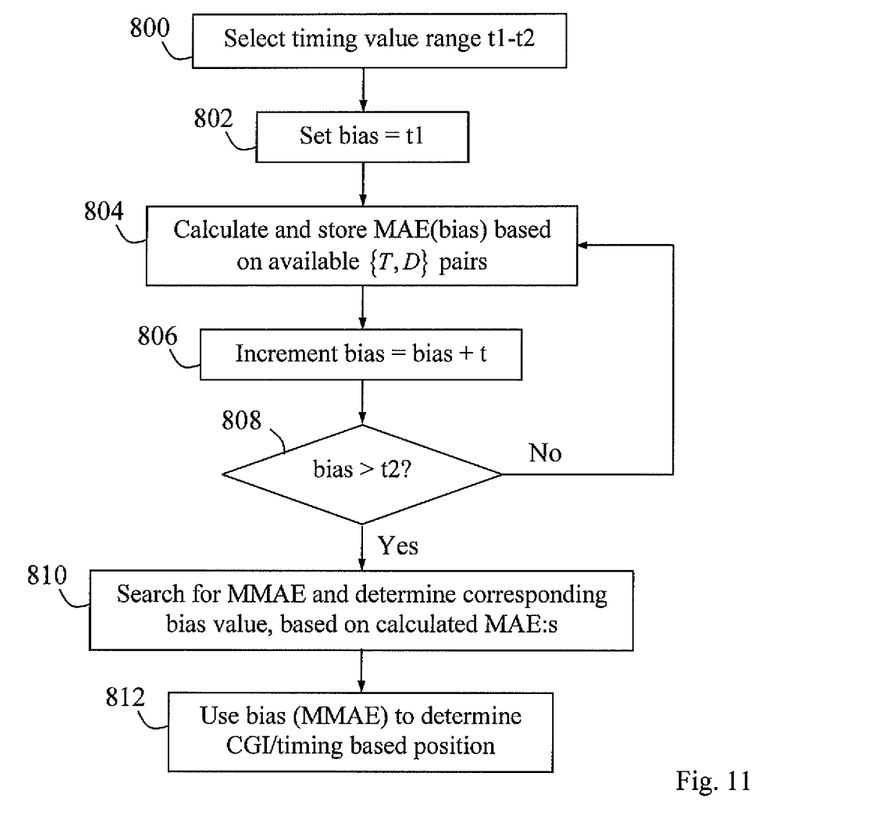
FIG. 11 shows a flow chart illustrating a procedure for obtaining a timing based position adjusted by a determined timing bias, according to yet another possible embodiment.

The procedure of FIG. 11 basically involves a search for a TA bias that provides a minimum value of MAE in Equation (1), i.e., the MMAE. In a first step 800, a rough range of candidate TA values t1-t2 is selected within which the MMAE search is to be executed. The search then starts from a first candidate TA bias value t1 which is set in a next step 802. An MAE value is calculated in a step 804, using the candidate TA bias value t1 and the available $\{T,D\}$ pairs as input to Equation (1). In a next step 806, the TA bias is incremented by one step t to provide a new candidate TA bias value t1+t. If in a following step 808 the TA bias has not exceeded the upper range limit t2, i.e., "No" in step 808, the calculation of step 804 is repeated for the new candidate TA bias=bias+t and the TA bias is further incremented in step 806, and so forth.

Eventually, when the TA bias has been incremented to exceed t2, resulting in "Yes" in step 808, the MAE has been calculated for the entire range of t1-t2. A search for MMAE among the calculated and stored values of MAE from step 804, is then performed in a further step 810. A TA bias value that corresponds to the MMAE is then determined as the calibration parameter that will provide the most accurate position determination using the TA based positioning method. In a final shown step 812, the determined TA bias value corresponding to MMAE is used to adjust a current TA value of any subsequent terminal, for input to the TA based positioning method, thereby providing a more accurate position for the terminal.

Figure 12:
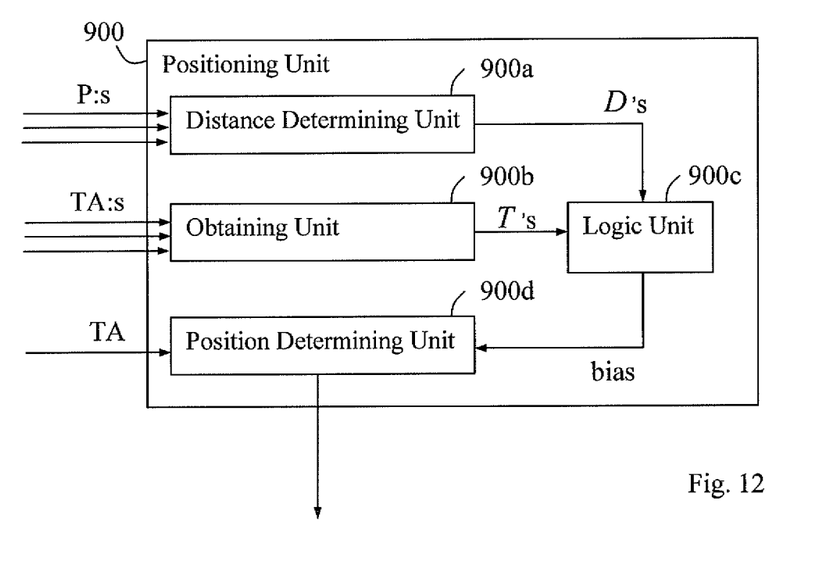
FIG. 12 shows a block diagram illustrating a positioning unit in more detail, according to yet another embodiment.

An arrangement in a positioning unit for determining the position of mobile terminals in a cell of a mobile communication network, will now be described in more detail with reference to the block diagram illustrated in FIG. 12. It is assumed that time alignment is employed for terminal transmissions in timeslots to a serving base station providing radio coverage in the cell.

The positioning unit 900, which may be the SMLC 402 in FIG. 4, comprises a distance determining unit 900a adapted to determine the distance D to the base station for at least one mobile terminal in the cell using a TA independent positioning method. Positioning unit 900 further comprises an obtaining unit 900b adapted to obtain a current TA value T used by the at least one mobile terminal for signal transmissions in an allocated timeslot.

Positioning unit 900 further comprises a logic unit 900c adapted to estimate a relation between the determined TA independent distance and the obtained current TA value for each mobile terminal. Logic unit 900c is also adapted to determine a general TA bias of the cell or a mobile terminal based on the estimated relation. Positioning unit 900 further comprises a position determining unit 900d adapted to determine positions of any subsequent terminals using a TA based positioning method and the TA bias.

The logic unit 900c may also be adapted to estimate the relation by translating each determined TA independent distance into a TA value that is compared with the obtained current TA value used for signal transmissions. In that case, the logic unit 900c may be further adapted to determine the TA bias based on the deviation of the TA value used for signal transmissions from the translated TA value.

The logic unit 900c may also be adapted to estimate the relation by translating each obtained TA value into a TA based distance that is compared with the corresponding determined TA independent distance. In that case, the logic unit 900c may be further adapted to determine the TA bias based on the deviation of the translated TA based distance from the determined TA independent distance.

The obtaining unit 900b may be further adapted to obtain the current TA value from a base station controller in signaling messages of a positioning method according to any of: CGI/TA, U-TDOA and any satellite based navigation or positioning system.

Figure 13:
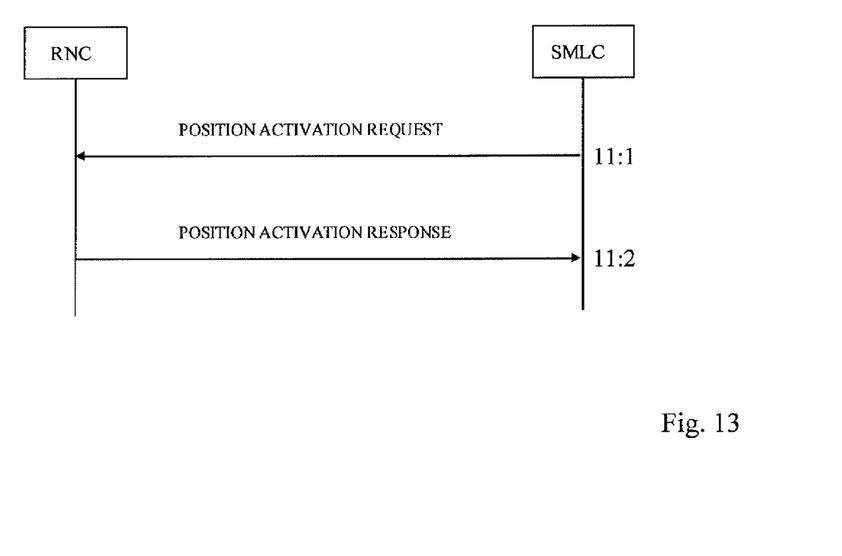
FIG. 13 shows a signalling diagram that can be used to provide the position of a mobile terminal in WCDMA networks, according to some further embodiments.

The embodiments of FIGS. 2-9 were described in terms of Time Alignment as used in Global System for Mobile communications (GSM) networks. It will be appreciated that the position determining method and apparatus disclosed herein may be applied to other timing based positioning techniques associated with other communication networks. For example, the embodiments of FIGS. 2-7 may also be implemented using Round-Trip Time (RTT) as used in a Wideband Code Division Multiple Access (WCDMA) network, as shown in FIG. 13. In the TA case, the timing value T may be determined according to:

$$T = TA \cdot D_{sym} \cdot \frac{C}{2}, \quad (2)$$

where TA represents the time advance, $D_{sym}$ represents the symbol duration, and C represents the speed of light. In the RTT case, the timing value T may be determined according to:

$$T = \left(\frac{RTT}{16} + 876 - UERxTx\right) D_{chip} \frac{C}{2} \quad (3)$$

where RTT represents the round-trip time, UERxTx represents the time difference between the uplink and downlink as measured from the mobile terminal, $D_{chip}$ represents the chip duration, and C represents the speed of light. In either case, the calculated timing value may be used to determine the timing bias, and therefore, the position of subsequent terminals using the techniques disclosed herein. In this case, the timing independent distance may be obtained using any of the AGNSS (Assisted Global Navigation Satellite Systems), U-TDOA (Uplink Time Difference of Arrival), OTDOA (Observed Time Difference of Arrival) via PCAP (Positioning Calculation Application Part) and RRC (Radio Resource Control) protocol, where the RNC 400 is involved and the SMLC 402 may be involved for these procedures. One of the approaches to obtaining a timing independent distance is to determine the true location of the terminal first, after which the distance between the terminal location and the base station antenna can be calculated based on the known location of the base station antenna.

In yet another example, the network comprises an LTE network, as discussed with respect to FIGS. 8-10, and the timing value T is determined based on timing information measured by at least one of the base station and the at least one mobile station. For example, T=TA(C/2), where TA is in units of seconds, and can be obtained from the UE RxTxTimeDifference (Type 1 or Type 2) or Tadv (Timing Advance) in LPPA. It will be appreciated that the TA value may also be received by the UE in a downlink command, as defined in LTE RRC TS36.133 Ch7.3.

The above-described embodiments can provide a mechanism for using a more accurate timing value for positioning determination according to the timing based method. The adjusted timing value used as input to the timing based method may be any value not limited to integers. The conventional CGI/TA positioning method, e.g., can thus be given significantly improved accuracy without introducing extra signalling traffic.

Further, by combining the output of a positioning method with timing values obtained from signalling messages during the positioning procedure, a database can be easily populated with {T,D} pairs without human effort. The impact of timing value fluctuation due to radio access network implementation can also be reduced, and the timing positioning method will become more robust. The above-described solution can further be applied for any mobile communication system using the timing mechanisms, e.g., GSM, E-UTRAN, WCDMA, etc.

While the invention has been described with reference to specific exemplary embodiments, the description is in general only intended to illustrate the inventive concept and should not be taken as limiting the scope of the invention. Further, the invention is not limited to any particular cellular networks, timing independent positioning methods or standards, and may be used for providing improved positioning accuracy for any type of mobile network employing timing adjustment. The present invention is defined by the appended claims.

The invention claimed is:

1. A method of determining positions of mobile terminals in a cell of a mobile communication network where time alignment is employed for terminal transmissions in timeslots to a serving base station providing radio coverage in said cell, the method comprising:
   determining a timing independent distance (D) to the base station for at least one mobile terminal in the cell;
   obtaining a current timing value (T) used by the at least one mobile terminal for timing adjustment of uplink signal transmissions;
   estimating a relation between the determined timing independent distance and the obtained current timing value for each mobile terminal;
   determining a timing bias of the cell or the at least one mobile terminal based on the estimated relation as a calibration parameter for position determination of any mobile terminals in said cell using a timing based positioning method;
   adjusting the current timing value based on the timing bias to determine an adjusted timing value; and
   determining a position of a subsequent mobile terminal using the timing based positioning method and said adjusted timing value.

2. The method according to claim 1, wherein estimating said relation comprises translating each determined timing independent distance into a translated timing value that is compared with the obtained current timing value used for signal transmissions.

3. The method according to claim 2, wherein determining the timing bias comprises determining the timing bias based on a deviation of the current timing value used for signal transmissions from the translated timing value.

4. The method according to claim 1, wherein estimating said relation comprises translating each current timing value into a translated timing based distance that is compared with the corresponding determined timing independent distance.

5. The method according to claim 4, wherein determining the timing bias comprises determining the timing bias based on a deviation of the translated timing based distance from the determined timing independent distance.

6. The method according to claim 1, wherein obtaining the current timing value comprises obtaining the current timing value from a base station controller in signalling messages of a positioning method according to any of: a Cell Global Identity (CGI)/Timing Advance (TA), an Uplink Time Difference of Arrival (U-TDOA), a Round-Trip Time (RTT), and any satellite based navigation or positioning system.

7. The method according to claim 1, further comprising obtaining a sequence of T and D (terminal/base station distance) pairs {T(i),D(i)}, i=1 . . . N for a plurality of mobile terminals in the cell, wherein determining the timing bias comprises performing a search for a Minimum Mean Absolute Error (MMAE), using said {T,D} pairs as input in a formula of Mean Absolute Error "MAE" defined as:

$$MAE = \frac{1}{N}\sum_{i=1}^{N} \text{abs}\left(T(i) - \text{round}\left(\frac{2}{C*Tc}D(i) + \text{bias}\right)\right),$$

where round represents an operator of rounding to the nearest integer, abs represents an operator providing an absolute value, bias represents a timing bias variable for MMAE searching, C represents the speed of light, and Tc represents a time interval corresponding to one alignment step.

8. The method according to claim 7, further comprising selecting a range of timing values (t1-t2) within which the MMAE search is executed, and calculating MAE values using different candidate timing bias values and said {T,D} pairs as input to the formula of MAE.

9. The method according to claim 8, wherein determining the timing bias comprises selecting, from among the calculated MAE values, the timing bias that provides the MMAE.

10. The method according to claim 1 wherein the mobile communication network comprises a Global System for Mobile communications (GSM) network and the timing value comprises a Timing Advance (TA) value.

11. The method according to claim 1 wherein the mobile communication network comprises a Wideband Code Division Multiple Access (WCDMA) network, and wherein obtaining the current timing value comprises obtaining the current timing value based on a Round-Trip Time (RTT) value.

12. The method according to claim 1 wherein the mobile communication network comprises a Long Term Evolution (LTE) network, and wherein obtaining the current timing value comprises obtaining the current timing value based on timing information measured by the base station or the at least one mobile station, or both.

13. A positioning unit configured to determine positions of mobile terminals in a cell of a mobile communication network where time alignment is employed for terminal transmissions in timeslots to a serving base station providing radio coverage in said cell, the arrangement comprising:
 a distance determining unit configured to determine a distance timing independent D) to the base station for at least one mobile terminal in the cell;
 an obtaining unit configured to obtain a current timing value (T) used by the at least one mobile terminal for timing adjustment of uplink signal transmissions;
 a logic unit configured to estimate a relation between the determined timing independent distance and the obtained current timing value for each mobile terminal, and to determine a timing bias of the cell or the at least one mobile terminal based on the estimated relation as a calibration parameter for position determination of any mobile terminals in said cell using a timing based positioning method; and
 a position determining unit configured to adjust the current timing value based on the timing bias to determine an adjusted timing value, and to determine a position of a subsequent mobile terminal using the timing based positioning method and said adjusted timing value.

14. The positioning unit according to claim 13, wherein the logic unit is configured to estimate said relation by translating each determined timing independent distance into a translated timing value that is compared with the obtained current timing value used for signal transmissions.

15. The positioning unit according to claim 14, wherein the logic unit is configured to determine the timing bias based on a deviation of the current timing value used for signal transmissions from the translated timing value.

16. The positioning unit according to claim 13, wherein the logic unit is configured to estimate said relation by translating each current timing value into a translated timing based distance that is compared with the corresponding determined timing independent distance.

17. The positioning unit according to claim 16, wherein the logic unit is configured to determine the timing bias based on a deviation of the translated timing based distance from the determined timing independent distance.

18. The positioning unit according to claim 13, wherein the obtaining unit is configured to obtain the current timing value from a base station controller in signalling messages of a positioning method according to any of: a Cell Global Identity (CGI)/Timing Advance (TA), an Uplink Time Difference of Arrival (U-TDOA), a Round-Trip Time (RTT), and any satellite based navigation or positioning system.

19. The positioning unit according to claim 13, wherein the logic unit is further configured to obtain a sequence of T and D (terminal/base station distance) pairs {TA(i),D(i)}, i=1 . . . N for a plurality of mobile terminals in the cell, wherein the logic unit determines the timing bias by performing a search for a Minimum Mean Absolute Error (MMAE), using said {T,D} pairs as input in a formula of Mean Absolute Error "MAE" defined as:

$$MAE = \frac{1}{N}\sum_{i=1}^{N} \text{abs}\left(T(i) - \text{round}\left(\frac{2}{C*Tc}D(i) + \text{bias}\right)\right),$$

where round represents an operator of rounding to the nearest integer, abs represents an operator providing an absolute value, bias represents a timing bias variable for MMAE searching, C represents the speed of light, and Tc represents a time interval corresponding to one alignment step.

20. The positioning unit according to claim 19, wherein the logic unit is further configured to select a range of timing values (t1-t2) within which the MMAE search is executed, and to calculate MAEs value using different candidate timing bias values and said {T,D} pairs as input to the formula of MAE.

21. The positioning unit according to claim 20, wherein the logic unit is configured to determine the timing bias by selecting, from among the calculated MAE values, the timing bias value that provides the MMAE.

22. The positioning unit according to claim 13 wherein the mobile communication network comprises a Global System for Mobile communications (GSM) network and the timing value comprises a Timing Advance (TA) value.

23. The positioning unit according to claim 13 wherein the mobile communication network comprises a Wideband Code Division Multiple Access (WCDMA) network, and wherein the obtaining unit obtains the current timing value by obtaining the current timing value based on a Round-Trip Time (RTT) value.

24. The positioning unit according to claim 13 wherein the mobile communication network comprises a Long Term Evolution (LTE) network, and wherein the obtaining unit obtains the current timing value by obtaining the current timing value based on timing information measured by the base station or the at least one mobile station or both.

* * * * *

UNITED STATES PATENT AND TRADEMARK OFFICE
CERTIFICATE OF CORRECTION

PATENT NO. : 8,914,038 B2  
APPLICATION NO. : 13/305154  
DATED : December 16, 2014  
INVENTOR(S) : Zhang Page 1 of 1

It is certified that error appears in the above-identified patent and that said Letters Patent is hereby corrected as shown below:

In the Specification

In Column 1, Lines 5-6, delete "2011, which" and insert -- 2011, now Pat. No. 8,135,416, which --, therefor.

In Column 1, Line 43, delete "Multiplex" and insert -- Multiple --, therefor.

In the Claims

In Column 14, Line 7, in Claim 13, delete "D)" and insert -- (D) --, therefor.

Signed and Sealed this
Eighteenth Day of August, 2015

Michelle K. Lee
*Director of the United States Patent and Trademark Office*